United States Patent
Abel et al.

(10) Patent No.: US 9,470,407 B2
(45) Date of Patent: Oct. 18, 2016

(54) AIRFIELD LIGHTING APPARATUS

(71) Applicant: Hella KGaA Hueck & Co., Lippstadt (DE)

(72) Inventors: Bjorn Abel, Lippstadt (DE); Klaus Auras, Lippstadt (DE); Thomas Albert Robbecke, Erwitte (DE); Ralf Ruther, Anrochte (DE)

(73) Assignee: Hella KGaA Hueck & Co (DE)

( * ) Notice: Subject to any disclaimer, the term of this patent is extended or adjusted under 35 U.S.C. 154(b) by 0 days.

(21) Appl. No.: 13/778,634

(22) Filed: Feb. 27, 2013

(65) Prior Publication Data

US 2013/0170205 A1    Jul. 4, 2013

Related U.S. Application Data

(63) Continuation of application No. PCT/EP2011/064777, filed on Aug. 29, 2011.

(30) Foreign Application Priority Data

Aug. 31, 2010    (DE) .................. 10 2010 036 019

(51) Int. Cl.
| | |
|---|---|
| *F21V 11/00* | (2015.01) |
| *F21V 29/00* | (2015.01) |
| *B64F 1/20* | (2006.01) |
| *F21V 7/00* | (2006.01) |
| *F21V 15/01* | (2006.01) |
| *F21V 17/12* | (2006.01) |
| *F21V 21/00* | (2006.01) |
| *F21W 111/06* | (2006.01) |
| *F21Y 101/02* | (2006.01) |

(52) U.S. Cl.
CPC ............. *F21V 29/002* (2013.01); *B64F 1/205* (2013.01); *F21V 7/00* (2013.01); *F21V 15/011* (2013.01); *F21V 17/12* (2013.01); *F21V 21/00* (2013.01); *F21V 29/004* (2013.01); *F21V 29/22* (2013.01); *F21V 29/246* (2013.01); *F21V 29/262* (2013.01); *F21W 2111/06* (2013.01); *F21Y 2101/02* (2013.01)

(58) Field of Classification Search
USPC ................... 362/240, 362, 374, 375, 249.01, 362/249.02, 196, 235
See application file for complete search history.

(56) References Cited

U.S. PATENT DOCUMENTS

| | | | |
|---|---|---|---|
| 3,250,907 A | 5/1966 | Keck et al. | |
| 3,353,013 A | 11/1967 | Robertson et al. | |
| 3,624,379 A | 11/1971 | Bliss et al. | |
| 2001/0030869 A1* | 10/2001 | Orellana | 362/375 |
| 2007/0274084 A1* | 11/2007 | Kan et al. | 362/373 |
| 2010/0142199 A1* | 6/2010 | Liu | 362/234 |

FOREIGN PATENT DOCUMENTS

| | | |
|---|---|---|
| DE | 10149263 A1 | 9/2002 |
| DE | 202009009583 U1 | 9/2009 |

OTHER PUBLICATIONS

The International Search Report for PCT/EP2011/064777 with a mailing date of Dec. 28, 2011.

* cited by examiner

*Primary Examiner* — Evan Dzierzynski
(74) *Attorney, Agent, or Firm* — Yakov Sidorin; Quarles & Brady LLP

(57) ABSTRACT

Lighting apparatus for airports, in particular flush light, having housing with a housing base and a housing top that includes a recess for receiving a light disc. Light disc facilitates the emission of light from a light source, disposed in the interior of the housing, to the surroundings. A light source carrier on which the light source is mounted is attached to a heat transfer block locked in a recess of the housing top such that edges and/or at least partially flat sides of the heat transfer block are in direct contact with the corresponding sides of the recess.

23 Claims, 3 Drawing Sheets

AIRFIELD LIGHTING APPARATUS

CROSS-REFERENCE TO RELATED APPLICATIONS

This application is a continuation of pending International Application No. PCT/EP2011/064777 filed on Aug. 29, 2011 and published as WO 2012/028562 A2, which designates the United States and claims priority from German Patent Application No. 10 2010 036 019.8 filed on Aug. 31, 2010. The entire disclosure of each of the above-mentioned patent applications is incorporated herein by reference for all purposes.

TECHNICAL FIELD

The invention relates to lighting apparatus for airports, especially in-pavement lights, interchangeably referred to as flush lights.

BACKGROUND

A lighting apparatus for airports is described, for example, in DE 20 2009 009 583 U1 which in its capacity as an in-pavement light includes a housing with a housing base and a housing top. A light source is arranged within the housing on a light source carrier. A translucent window is positioned in a recess of the housing top, so that light emitted by the light source can be emitted to the outside through the translucent window within a predetermined angular range. In order to ensure that the heat generated by the light source is removed, to avoid overheating, the housing top or the housing part contains a central heat transfer web or a heat transfer web. A heat transfer plate is additionally arranged between the opposite heat transfer webs of the housing base and the housing top such that the light source carrier is positioned on the heat transfer plate. It is disadvantageous that the mounting of such lighting apparatus is relatively complex and that several different parts are required to enable heat removal.

There remains a need, therefore, to simplify the structure of a lighting apparatus to ensure a compact housing, effective heat removal, and mounting with reduced effort with few components.

SUMMARY OF THE INVENTION

A lighting apparatus for airports (in particular, a flush light) has housing including a housing base and a housing top. The housing may comprise a recess structured to receive an optically translucent element (such as a window or a prism) through which light from a light source in the interior of the housing can exit the housing to the surroundings. The lighting apparatus may include a light source carrier (for example, a printed circuit board), on which the light source is mounted. The light source carrier may be attached to a heat transfer element, engaging in a recess of the housing top, such that edges and/or at least partially flat sides of the heat transfer element directly contact the corresponding sides of the recess.

The embodiment of the invention is advantageously structured such that the light source, the light source carrier that carries the light source, and optional additional optical elements (such as, for example, a reflector) are combined into a common modular unit together with a heat transfer element, which modular unit can be fastened in a recess of the housing top by at least one screw clamp, bolt or similar releasable connecting means, a screw connection for example. The housing top is not only used as a housing cover but also as a basic mounting part with functional areas thereof adapted to accommodate the modular unit, thereby facilitating repair capabilities and reducing mounting costs. As at least part of a surface of a recess and/or at least partly flat sides of the heat transfer element are arranged directly on the corresponding sides of the recess of the housing top, the heat dissipation is enabled from the light source carrier via the heat transfer element into the housing.

In accordance with a related embodiment of the invention, a heat transfer element is dimensioned to fit in the housing and the light source carrier is dimensioned to fit on a heat transfer element. The heat transfer element is used as a carrier for the light source and auxiliary optical elements and, on the other hand, for the dissipation of heat into the housing top. In production, concerns related to tolerancing of individual components are reduced because it is substantially merely necessary to connect the housing top with the modular unit on the one hand and the housing top with the housing base on the other hand.

In accordance with a further embodiment of the invention, the heat transfer element comprises a first surface section structured to accommodate the light source carrier and/or the light source and/or further optical elements, and furthermore an adjacent second surface section adapted for heat dissipation and/or for redirecting a power supply. The second surface section is therefore not only used for heat dissipation, but allows on the other hand the establishment of contact of the light source arranged on an upper flat side with control electronics arranged in the bottom housing part.

In accordance with another embodiment of the invention, the heat transfer element and/or the housing top and/or the housing base is preferably made of a metallic material, preferably aluminum, to improve heat dissipation.

BRIEF DESCRIPTION OF THE DRAWINGS

In the following, the invention is described by way of examples of embodiments and without limitation of the general inventive concept, with reference to the drawings.

Figure 1:
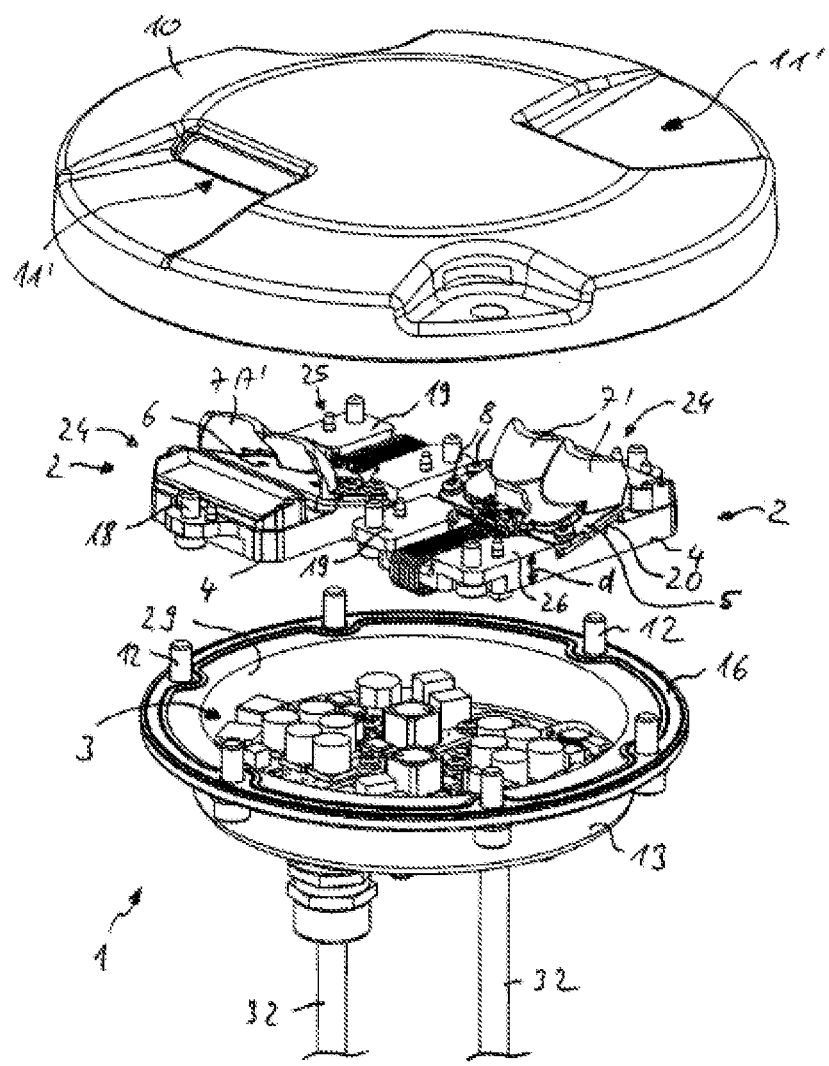
FIG. 1 is an exploded perspective view of an embodiment of a lighting apparatus as seen from above.
Figure 2:
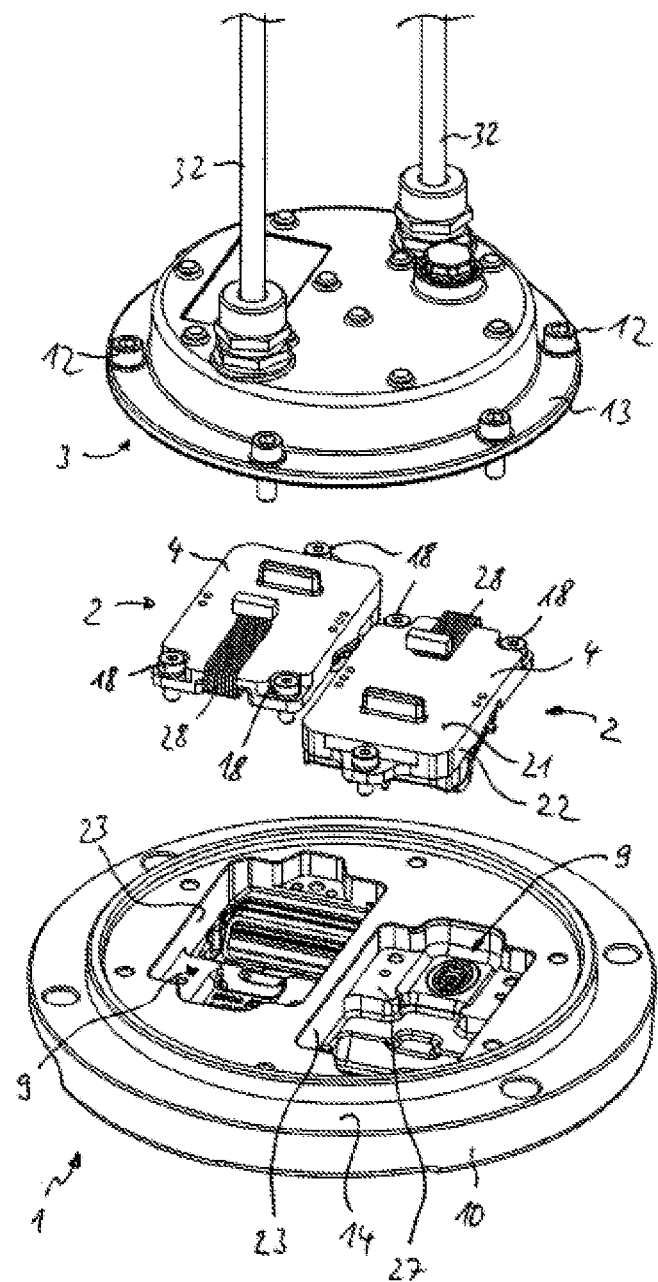
FIG. 2 is an exploded view of an embodiment of FIG. 1 as seen from below.
Figure 3:
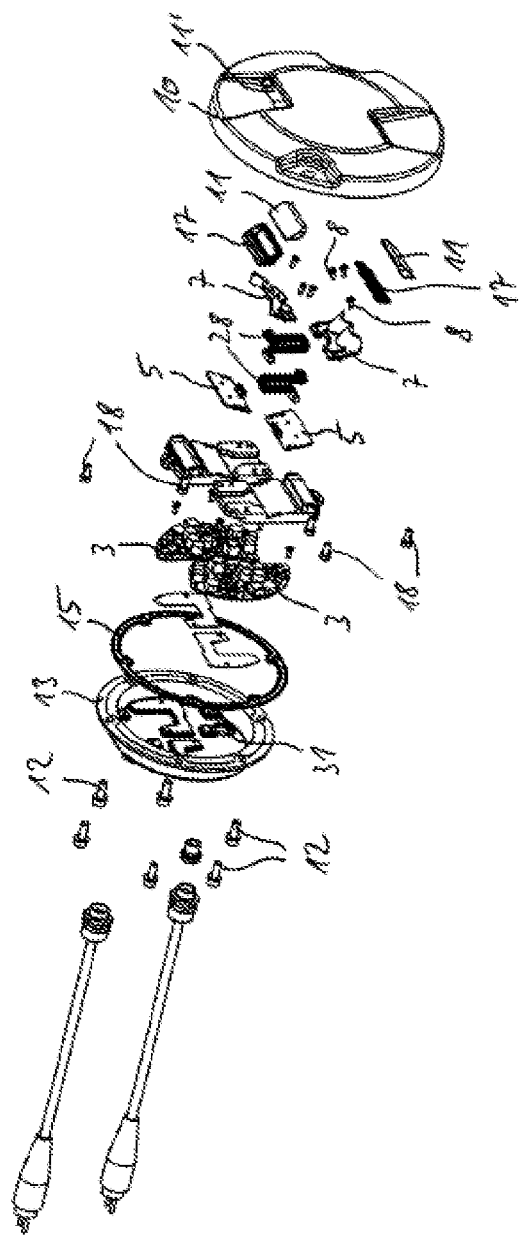
FIG. 3 is another detailed exploded perspective view of an embodiment.

The lighting apparatus of FIGS. 1 to 3 includes a housing 1 having a housing base 13 and a housing top 10. The housing top 10 has a recess 11' accommodating a translucent window-like cover 11, by means of which light from a light source 6 disposed in the interior of the housing 1 can be emitted to the surrounding environment. The light source 6 is mounted on a light source carrier 5. The light source carrier 5 is positioned on top of a heat transfer element 4, the latter engaging in a form fitting manner into a recess 9 in the housing top 10. The heat transfer element 4 is attached with screws to the housing top 10. Thereby, enhanced heat dissipation is obtained from light source 5 via the light source carrier 6 and the heat transfer element 4 to the housing top 10. The housing has a comparatively large surface that is cooled by surrounding air and, therefore, acting as heat sink. The thermal connection of the heat transfer element to the housing base 13 and associated electronic circuitry may be reduced, thereby enhancing the lifetime of the electronic circuitry.

While the invention can be appropriately modified, examples of embodiments are shown in the drawings and described in detail. It should be understood, however, that the drawings and detailed description are not intended to limit the invention to any particular form disclosed, but on the contrary, the intention is to cover all modifications, equivalents and alternatives falling within the spirit and scope of the present invention as defined by the appended claims.

DETAILED DESCRIPTION

FIGS. 1 to 3 illustrate a preferred embodiment as can preferably be used at airports as in-pavement light in order to mark a roadway or a runway.

As can be seen in FIG. 1, FIG. 2 and FIG. 3, the lighting apparatus includes a housing 1 in which first and second or more lighting modules 2 and control electronics 3 are arranged.

The lighting modules 2 includes heat transfer element 4. As depicted in FIG. 1 to FIG. 3, the heat transfer element may be a massive cuboid-like heat transfer block, to which a light source carrier 5 (provided with a light source 6 and a reflector 7) may be fixed by means of a screwed connection 8. The light source carrier 5 is arranged as a printed circuit board on which the LED light sources 6 (in the present case two LED light sources 6, LED chips) are arranged.

The LED light sources 6 are respectively associated with reflector areas 7', so that light emitted by the light sources 6 is deflected in the direction of a translucent window like cover 11 fitted into a recess 11' of a housing top 10, and can be emitted to the surrounding environment. The housing top 10 is detachably connected by means of a screwed connection 12 with a housing base 13 of the housing 1, wherein a circumferential edge 14 of the housing top 10 is directly (and, optionally, exclusively) connected via a flat seal 15 with a circumferential edge 16 of the housing base 13.

The translucent cover 11 is fitted via a seal 17 in the recess 11' of the housing top 10. Since the lighting module 2 is detachably connected with the housing top 10 via a screwed connection 18, a solid fit of the translucent coyer 11 in the recess 11' is ensured.

In accordance with an alternative embodiment of the invention (not shown), the lighting module 2 and/or the heat transfer element 4 can be detachably connected to the housing top by means of a bayonet catch or by latching on the housing top 10.

The heat transfer element 4 includes an oblique surface 20 on an upper flat side 19 of the heat transfer element, to which the plate-like light source carrier 5 is fixed by means of the screwed connection 8. An opposite bottom flat side 21 of the heat transfer element 4 is preferably arranged in a flush manner with a bottom side of the housing top 10. Circumferential boundary surfaces 22 of the heat transfer element 4 rest directly on corresponding boundary sides 23 of a recess 9 of the housing top 10. Preferably, the heat transfer element 4 is arranged in an interlocking fashion in the recess 9 of the housing top 10.

In accordance with an embodiment of the invention, the heat transfer element 4 can therefore be arranged in an interlocking and/or friction-locked manner in the recess 9 of the housing top 10.

The light source carrier 5 and/or the reflector 7 is arranged in a first surface section 24 on the flat side 19 of the heat transfer element 4. In a second surface section 25 of the heat transfer element 4, heat dissipation areas 26 which rest directly on corresponding base areas 27 of the recess 9 are provided to improve heat dissipation. The heat transfer areas form a part of the upper flat side 19. On the other hand, the second surface section 25 enables a deflection or redirection of a connection line 28, e.g. for powering the light sources and/or data exchange between a control circuitry and electronics on the light source carrier 5. The connection line 28 may be a ribbon cable. One end of the connection line 28 is connected with a connection of the light source carrier 5. An opposite end of the connection line 28 is connected with a connection of the control electronics 3 which is positioned in a cavity 29 of the housing base 13.

The heat transfer element 4 has a wall thickness d that is larger than a wall thickness of the light source carrier 5. Preferably, the wall thickness d of the heat transfer element 4 is more than twice as large as the wall thickness of the light source carrier 5.

The cuboid heat transfer element 4 has flat sides 19, 21 that are more than twice as large as flat sides of the light source carrier 5.

The heat transfer element 4 and the housing top 10 and the housing base 13 are preferably made of a heat-conducting metal material, especially aluminium. The housing base 13 is detachably connected with the housing top 10 via a screw connection 12. Openings 31 for the connection of electric cables 32 are provided in a base area of the housing base 13, so that the control electronics 3 can be supplied with electrical power.

For the purpose of mounting the lighting apparatus, the lighting module 2 is mounted, in a first step, on the heat transfer element 4 by means of the screwed connection 8 of the light source carrier 5 and under connection of the connection line 28 to the light source carrier 5. Subsequently, the lighting module 2 is locked in the recess 9 by means of the screwed connection 18, wherein the translucent cover 11 has previously been positioned in the recess 11'. Thereafter, the housing base 13 that is provided with the control electronics 3 can be connected by means of the screwed connection 12 with the housing top 10, wherein the lighting module 2 and the control electronics 3 are arranged in the interior of the housing 1.

It will be appreciated by those skilled in the art that this invention provides lighting apparatus particularly suited for airport lighting. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

1 housing
2 lighting modules
3 control electronics
4 heat transfer element
5 light source carrier
6 light source 7, 7' reflector, reflector areas
8 screw connection
9 recess
10 housing top
11, 11' translucent cover (window)/recess
12 screw connection
13 bottom housing part
14 edge
15 flat seal
16 edge
17 seal
18 screw connection
19 upper flat side
20 oblique surfaces
21 bottom flat side
22 boundary side
23 boundary side
24 first surface section
25 second surface section
26 heat transfer areas
27 base areas
28 connection line (power and/or data)
29 cavity
31 opening
32 electric cable
d wall thickness

The invention claimed is:
1. A lighting apparatus for airports comprising:
a housing having a bottom housing part and a housing top,
    wherein the housing top comprises a first recess sized to fit around a lens affixed therein with a seal,
    wherein said lens is structured to transmit light to the ambient environment from a light source arranged in an interior space of the housing,
a light source carrier on which the light source is mounted,
    wherein the light source carrier is fixed to an upper surface of a heat-conducting block, said upper surface being oblique with respect to a lower surface of the heat-conducting block,
    wherein said heat-conducting block is secured in a second recess formed in a bottom surface of the housing top such that said upper surface faces said bottom surface,
    wherein at least one of the peripheral sides and at least partly flat sides of the heat-conducting block rest directly on corresponding sides of the second recess, and
    wherein the heat-conducting block is detachably fixed to the housing top, and
reflectors optically connecting the light source with said ambient environment through said lens,
    each of said reflectors structured to change both a direction of propagation and a curvature of a wavefront of light upon propagating of said light from the light source to the lens,
    each of said reflectors disposed at at least partly flat side of the heat conducting block.
2. A lighting apparatus according to claim 1,
wherein the heat conducting block comprises
    a first surface section structured (i) to accommodate the light source carrier and (ii) to dissipate heat, and
    a second surface section structured to effectuate at least one of diverting a power supply and dissipating heat, said second surface section being adjacent to the first surface section.
3. A lighting apparatus according to claim 2,
wherein at least one of the light source carrier and a reflector associated with the light source is fixed to the heat-conducting block by a screwed connection.
4. A lighting apparatus according to claim 2,
wherein only a circumferential edge of the bottom housing part is connected to a circumferential edge of the housing top.
5. A lighting apparatus according to claim 2,
wherein the bottom housing part includes a cavity, said cavity containing triggering electronics,
said triggering electronics being electrically connected to a terminal end of the power supply, and
wherein the light source carrier is arranged as a printed circuit board.
6. A lighting apparatus according to claim 2,
wherein at least one of the heat-conducting block and the housing top and the bottom housing part consists of a metal material.
7. A lighting apparatus according to claim 1,
wherein the heat conducting block is arranged in a form-fitting manner in the second recess of the housing top.
8. A lighting apparatus according to claim 7,
wherein at least one of the light source carrier and a reflector associated with the light source is fixed to the heat-conducting block by a screwed connection.
9. A lighting apparatus according to claim 7,
wherein only a circumferential edge of the bottom housing part is connected to a circumferential edge of the housing top.
10. A lighting apparatus according to claim 7,
wherein the bottom housing part includes a cavity, said cavity containing triggering electronics,
said triggering electronics being electrically connected to a terminal end of the power supply, and
wherein the light source carrier is arranged as a printed circuit board.
11. A lighting apparatus according to claim 7,
wherein at least one of the heat-conducting block and the housing top and the bottom housing part consists of a metal material.
12. A lighting apparatus according to claim 1,
wherein at least one of the light source carrier and a reflector associated with the light source is fixed to the heat-conducting block by a screwed connection.
13. A lighting apparatus according to claim 12,
wherein only a circumferential edge of the bottom housing part is connected to a circumferential edge of the housing top.
14. A lighting apparatus according to claim 12,
wherein the bottom housing part includes a cavity, said cavity containing triggering electronics,
said triggering electronics being electrically connected to a terminal end of the power supply, and
wherein the light source carrier is arranged as a printed circuit board.
15. A lighting apparatus according to claim 12,
wherein at least one of the heat-conducting block and the housing top and the bottom housing part consists of a metal material.
16. A lighting apparatus according to claim 1,
wherein only a circumferential edge of the bottom housing part is connected to a circumferential edge of the housing top.
17. A lighting apparatus according to claim 1,
wherein the bottom housing part includes a cavity, said cavity containing triggering electronics, said triggering electronics being electrically connected to a terminal end of the power supply, and wherein the light source carrier is arranged as a printed circuit board.

18. A lighting apparatus according to claim 1, wherein at least one of the heat-conducting block and the housing top and the bottom housing part consists of a metal material.

19. A lighting apparatus for airports comprising:

a housing having
- a housing top defining a top surface and containing first and second apertures through said top surface, said first and second apertures disposed opposite each other with respect to an axis that is perpendicular to said top surface;
- a housing bottom defining, when detachably affixed to the housing top, an interior volume therebetween;
- a heat-conducting element removably disposed in a recess of a bottom surface of the housing top; and
- first and second translucent windows affixed in said first and second apertures;

a light source carrier fixed to a heat-conducting block;

first and second light sources mounted on said light source carrier; and first and second reflectors optically connected with the first and second light sources, respectively, each of said first and second reflectors having two reflective wings merging with one another along a curved line.

20. A lighting apparatus according to claim 19, wherein said first and second light sources are disposed opposite each other with respect to an axis that is perpendicular to an upper surface of the heat-conducting block such that, when the light source carrier with said light sources therein are operably placed in said interior volume, said light sources are respectively disposed in optical communication with ambient surrounding said lighting apparatus through said first and second reflectors and said first and second translucent windows.

21. A lighting apparatus according to claim 19, wherein at least one of the light source carrier and a reflector associated with a light source is fixed to the heat-conducting block with a screwed connection.

22. A lighting apparatus according to claim 19, wherein said curved line is transverse to an upper surface of the heat-conducting block.

23. A lighting apparatus according to claim 19, wherein only a circumferential edge of the housing bottom is connected to a circumferential edge of the housing top.

* * * * *